US012571893B2

(12) United States Patent
Ozaki et al.

(10) Patent No.: US 12,571,893 B2
(45) Date of Patent: Mar. 10, 2026

(54) DISTANCE MEASURING APPARATUS AND METHOD OF DETERMINING DIRT ON WINDOW

(71) Applicant: DENSO CORPORATION, Kariya-city (JP)

(72) Inventors: Noriyuki Ozaki, Kariya-city (JP); Takehiro Hata, Kariya-city (JP); Akifumi Ueno, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1014 days.

(21) Appl. No.: 17/657,667

(22) Filed: Apr. 1, 2022

(65) Prior Publication Data

US 2022/0221565 A1     Jul. 14, 2022

Related U.S. Application Data

(63) Continuation of application No. PCT/JP2020/037118, filed on Sep. 30, 2020.

(30) Foreign Application Priority Data

Oct. 4, 2019   (JP) ................................. 2019-183438
Sep. 24, 2020  (JP) ................................. 2020-159470

(51) Int. Cl.
*G01S 7/497*     (2006.01)
*G01S 7/48*      (2006.01)

(52) U.S. Cl.
CPC ............ *G01S 7/497* (2013.01); *G01S 7/4808* (2013.01); *G01S 2007/4977* (2013.01)

(58) Field of Classification Search
None
See application file for complete search history.

(56) References Cited

FOREIGN PATENT DOCUMENTS

| | | | |
|---|---|---|---|
| JP | 7-280940 A | 10/1995 | |
| JP | 2009-192526 A | 8/2009 | |
| JP | 2011-013135 A | 1/2011 | |
| JP | 2011013135 | * 1/2011 | ............ G01S 17/08 |
| JP | 2012-060012 A | 3/2012 | |
| JP | 2016-176750 A | 10/2016 | |
| JP | 2017-049097 A | 3/2017 | |

* cited by examiner

*Primary Examiner* — Luke D Ratcliffe

(74) *Attorney, Agent, or Firm* — Maschoff Brennan

(57)     ABSTRACT

A distance measuring apparatus includes a light emitter, a receiver, a calculator, a case having a window, and a determiner for determining that dirt is adhered to the window in response to determination that a dirt determination condition is satisfied. The dirt determination condition includes a first condition that a specified light intensity level at a specified value of a time of flight for at least one pixel of a view region in a histogram is larger than or equal to at least one value of an intensity threshold calculated for the at least one pixel of the view region.

34 Claims, 8 Drawing Sheets

DIRT DETERMINATION
ROUTINE

S100

TIMING
OF DIRT DIAGNOSTIC
TASK ?　　　NO

YES

S200

OBTAIN CLUTTER PEAK LEVEL FROM
HISTOGRAM OF RECEIVED LIGHT
INTENSITY LEVELS

S300

IS DIRT
DETERMINATION CONDITION
SATISFIED ?　　　NO

YES

S400

PERFORM DIRT REMOVAL TASK

DISTANCE MEASURING APPARATUS AND METHOD OF DETERMINING DIRT ON WINDOW

CROSS REFERENCE TO RELATED APPLICATION

The present application is a bypass continuation application of a currently pending international application No. PCT/JP2020/037118 filed on Sep. 30, 2020 designating the United States of America, the entire disclosure of which is incorporated herein by reference, the international application being based on and claiming the benefit of priority of each of Japanese Patent Application No. 2019-183438 filed on Oct. 4, 2019 and Japanese Patent Application No. 2020-159470 filed on Sep. 24, 2020.

TECHNICAL FIELD

The present disclosure relates to technologies for determining dirt on a window of a distance measuring apparatus.

BACKGROUND

A typical distance measuring apparatus emits a light pulse, receives an echo pulse resulting from reflection of the light pulse by a target object, and measures the distance of the target object from the distance measuring apparatus as a function of time of flight defined between the emission of the light pulse and the reception of echo pulse.

SUMMARY

A distance measuring apparatus according to one aspect of the present disclosure includes a light emitter, a receiver, a calculator, a case having a window, and a determiner for determining that dirt is adhered to the window in response to determination that a dirt determination condition is satisfied. The dirt determination condition includes a first condition that a specified light intensity level at a specified value of a time of flight for at least one pixel of a view region in a histogram is larger than or equal to at least one value of an intensity threshold calculated for the at least one pixel of the view region.

DETAILED DESCRIPTION OF EMBODIMENT

Figure 1:
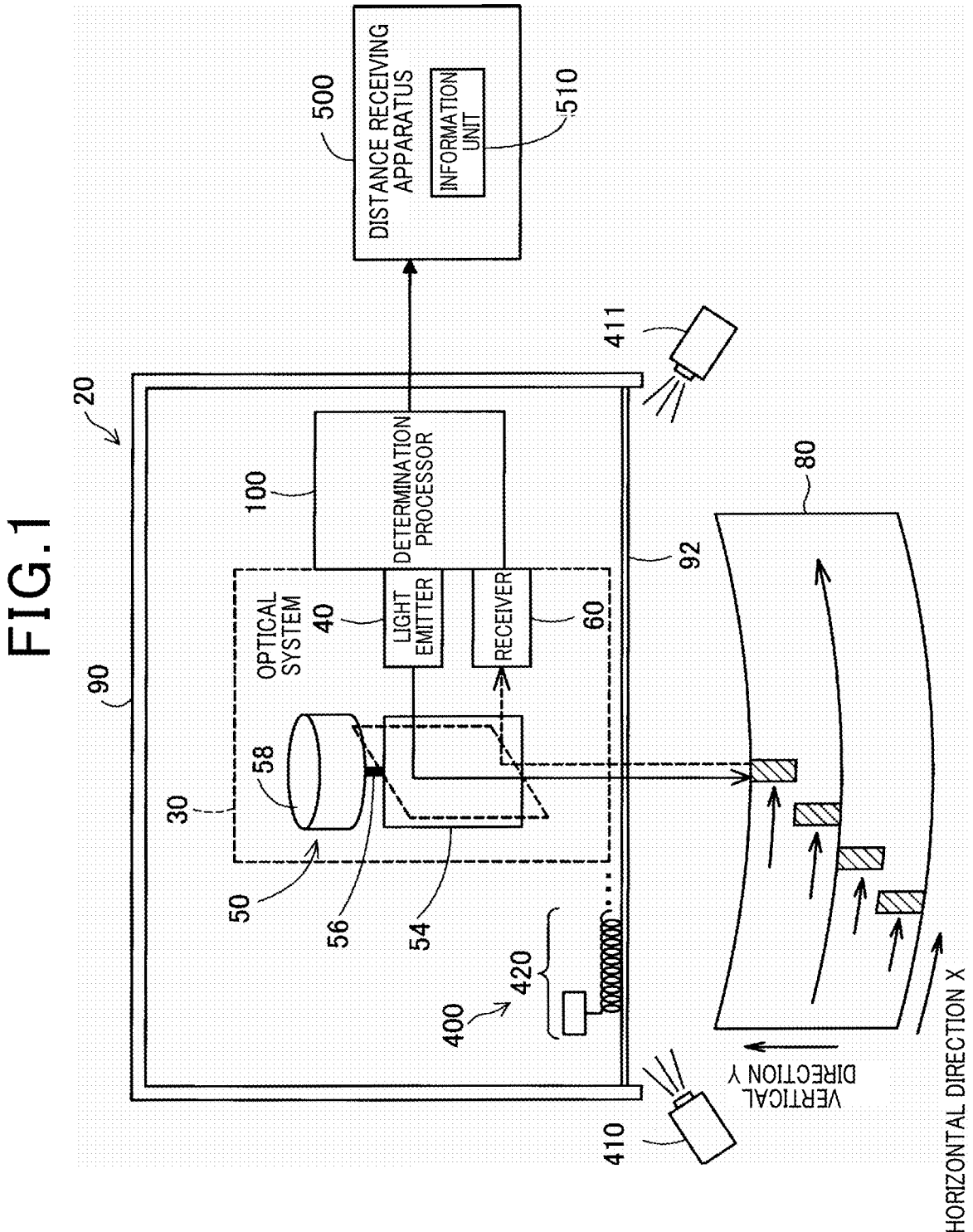
FIG. 1 is a diagram illustrating a schematic configuration of a distance measuring apparatus.

Japanese Patent Application Publication No. 2016-176750 discloses a distance measuring apparatus. The distance measuring apparatus emits a light pulse through a window thereof, receives, through the window, an echo pulse resulting from reflection of the light pulse by a target object, and measures the distance of the target object from the distance measuring apparatus as a function of time of flight defined between the emission of the light pulse and the reception of echo pulse.

Dirt adhered to the window of the distance measuring apparatus may make it difficult for the distance measuring apparatus to measure the distance of a target object due to a signal-to-noise ratio (S/N ratio) of the echo pulse. Technologies that determine whether there is dirt on the window of the distance measuring apparatus may however be considered sufficiently.

From this viewpoint, an exemplary aspect of the present disclosure provides a distance measuring apparatus. The distance measuring apparatus includes a light emitter configured to emit light pulses to a predetermined view region that is comprised of a plurality of pixels. The distance measuring apparatus includes a receiver configured to receive light echoes, each of the light echoes being based on reflection of a corresponding one of the emitted light pulses from a target object. The light echoes respectively have values of time of flight between the light emitter and the receiver. The distance measuring apparatus includes a calculator configured to calculate, in accordance with the received light echoes, a histogram representing an intensity level of each of the light echoes for a corresponding one of the values of the time of flight. The histogram has a predetermined baseline intensity level. The calculator is configured to calculate, in accordance with the values of the time of flight, a distance of the target object from the distance measuring apparatus.

The distance measuring apparatus includes a case that houses at least the light emitter and the receiver. The case has a window through which the light pulses and light echoes pass. The distance measuring apparatus includes a storage configured to store a distribution of values of a threshold setting parameter in the view region. The values of the threshold setting parameter are previously determined for the respective pixels of the view region. The distance measuring apparatus includes a determiner.

The determiner is configured to add the value of the threshold setting parameter for each of the pixels of the view region to the baseline intensity level to thereby calculate a value of an intensity threshold for a corresponding one of the pixels of the view region.

The determiner is configured to determine whether dirt is adhered to the window in accordance with a predetermined dirt determination condition, and determine that the dirt is adhered to the window in response to determination that the predetermined dirt determination condition is satisfied. The predetermined dirt determination condition includes a first condition that a specified light intensity level at a specified value of the time of flight for at least one pixel of the view region in the histogram is larger than or equal to at least one value of the intensity threshold calculated for the at least one pixel of the view region. The specified value of the time of flight corresponds to a length of a light path defined from the light emitter to the window.

The distance measuring apparatus of the exemplary aspect is configured to determine that dirt is adhered to the window in response to determination that the dirt determination condition previously determined based on the specified light intensity level at the specified value of the time of flight is satisfied. This configuration therefore enables determination of whether dirt is adhered to the window in accordance with received light-intensity levels of incoming light to the distance measuring apparatus.

The following describes an exemplary embodiment of the present disclosure with reference to the accompanying drawings.

Referring to FIG. 1, a distance measuring apparatus 20 includes a main unit and a case 90 that houses the main unit. The case 90 includes a window 92 constituting a front wall of the case 90. The main unit of the distance measuring apparatus 20 includes a cleanup unit 400 for performing a cleanup task for cleaning up dirt on the window 92. The cleanup unit 40 is located adjacent to the window 92.

The cleanup unit 400 of the exemplary embodiment includes first and second washers 410 and 411, and a heater 420. Each of the first and second washers 410 and 411 is configured to deliver a jet of water to an outer surface of the window 92 to accordingly remove dirt on the outer surface of the window 92 therefrom.

The first washer 410 according to the exemplary embodiment is located to remove dirt adhered to the left side of the outer surface of the window 92, and the second washer 411 according to the exemplary embodiment is located to remove dirt adhered to the right side of the outer surface of the window 92.

Three or more washers can be provided. That is, a plurality of washers can be provided for cleaning up respective regions, which are different from each other, of the outer surface of the window 92. Alternatively, a single washer can be provided for cleaning up the whole of the outer surface of the window 92.

Each of the plurality of washers, such as the first and second washers 410 and 411, can be configured to deliver a jet of air to the outer surface of the window 92 or to deliver both a jet of water and a jet of air to the outer surface of the window 92.

The heater 420 includes a heater wire located along an inner surface of the window 92. The heater 420 is configured to energize the heater wire to cause the heater wire to generate heat that heats the window 92. This enables snow and/or ice adhered to the outer surface of the window 92 to melt.

The exemplary embodiment can employ, as the cleanup unit 400, any one of other cleanup units, such as a wiper unit for wiping the outer surface and/or inner surface of the window 92.

The main unit of the distance measuring apparatus 20 includes an optical system 30 and a determination processor 100. The optical system 30 irradiates an outside object, such as a target object or a target, with light pulses for measurement of the distance to the outside object relative to the apparatus 20, and receives echo pulses, i.e., light echoes, each of which results from reflection of at least part of the corresponding one of the light pulses by the outside object. The determination processor 100 processes signals obtained by the optical system 30.

The optical system 30 includes a light emitter 40, a scanner 50, and a receiver 60. The light emitter 40 emits laser pulses as the light pulses, and the scanner 50 scans a predetermined view region 80 with each laser pulse. The receiver 60 receives incoming light including echo pulses from the outside object and ambient light.

The distance measuring apparatus 20 is, for example, designed as a vehicular lidar apparatus installed in a vehicle, such as an automobile. The lidar apparatus will be referred to simply as a LIDAR, which stands for Light Detection and Ranging.

The view region 80 of the distance measuring apparatus 20 has a rectangular shape with a lateral side and a vertical side. The view region 80 is located with the first side being parallel to a horizontal direction X and the vertical side being parallel to a vertical direction Y when the vehicle, in which the distance measuring apparatus 20 is installed, is traveling on a horizontal road surface.

Information measured by the distance measuring apparatus 20, such as the distance of the outside object from the apparatus 20, is outputted from the apparatus 20 to a distance receiving apparatus 500, and is used by the distance receiving apparatus 500. The distance receiving apparatus 500 is a control apparatus that includes an information unit 510 and an electronic control unit (ECU) installed in the vehicle. The information unit 510, which includes, for example, a display and a speaker, installed in the compartment of the vehicle, informs users of various information items.

Figure 2:
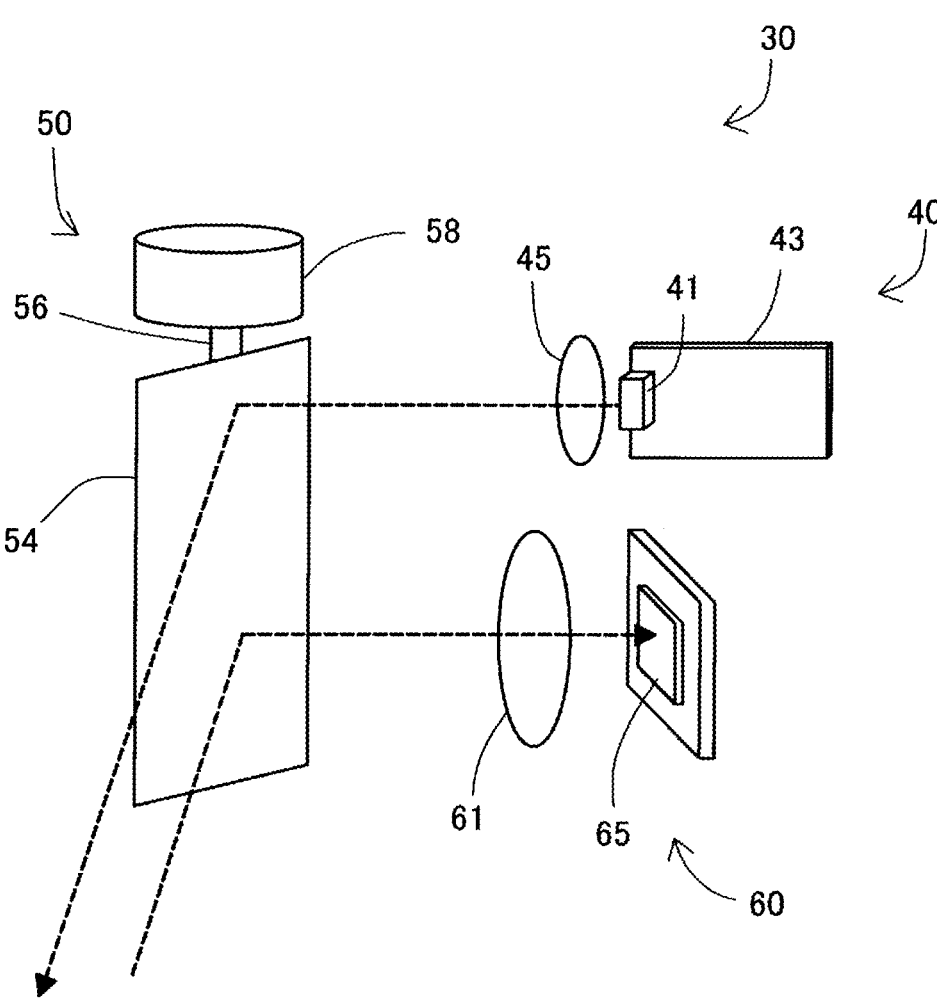
FIG. 2 is a diagram illustrating a schematic configuration of an optical system.

Referring to FIG. 2, the light emitter 40 includes a semiconductor laser device, which is simply referred to as a laser device, 41, a circuit board 43, and a collimator lens 45.

The laser device 41 is comprised of a plurality of laser diodes, each of which causes laser oscillation to thereby emit a short-pulsed laser beam as a laser pulse. The laser diodes of the laser device 41 according to the exemplary embodiment are aligned in the vertical direction. This arrangement of the laser diodes of the laser device 41 results in a rectangular laser-irradiation region generated by the short-pulsed laser beams emitted from the laser diodes. The laser device 41 will also be referred to as a light source. The collimator lens 45 is configured to collimate the short-pulsed laser beams, which have passed therethrough, into parallel laser beams.

The scanner 50 is configured as a one-dimensional scanner. Specifically, the scanner 50 includes a mirror 54, a rotor 56, and a rotary solenoid 58.

The mirror 54 is configured to reflect the parallel laser beams. The rotary solenoid 58, which includes a rotating portion, is configured to repeat alternate positive and negative rotations of the rotating portion in respective opposing positive and negative directions within a predetermined rotation range in accordance with a control signal received from the determination processor 100.

The rotor 56 is configured to be rotatable on a predetermined axis that is parallel to the vertical direction, and is linked to the rotating portion of the rotary solenoid 58 and to the mirror 54. The repeated alternate positive and negative rotations of the rotating portion of the rotary solenoid 58 perform repetition of alternative positive and negative rotations of the mirror 54 in the respective positive and negative directions in a direction parallel to the horizontal direction.

The parallel laser beams entering the mirror 54 enter the mirror 54. The repetition of the alternative positive and negative rotations of the mirror 54 cause the parallel laser beams, which have entered the mirror 54, to pass through the window 92 and thereafter to be scanned over the view region 80. The view region 80 therefore corresponds to a scanning region of the parallel laser beams. Because the parallel laser beams are scanned over the view region 80, received light intensities are obtained in respective partitioned pixels of the view region 80. This results in a distribution of the received light intensity levels in the view region 80 constituting an image. The view region 80 can also be therefore referred to as an image region.

The scanner 50 can be eliminated from the optical system 30. In this modification, the light pulses emitted from the light emitter 40 are irradiated over the view region 80, and the receiver 60 is configured to receive the light pulses irradiated over the view region 80. A data assembly representing the distribution of received light intensity levels in the view region 80 will also be refereed to as a frame, i.e., a light intensity frame. In other words, frames, each of which represents the data assembly representing the distribution of received light intensity levels in the view region 80, are successively obtained. Distance measurement is carried out by the determination processor 100 for each of the frames.

The receiver 60 includes a receiver lens 61 and a receiver array 65.

The laser pulses outputted from the distance measuring apparatus 20 are irregularly reflected by the surface of an outside object, such as a person or a vehicle, so that echo pulses resulting from the reflection of at least given number of the laser pulses by the surface of the outside object pass through the window 92 and thereafter enter the receiver lens 61 together with disturbance light as incoming light.

The incoming light is focused onto the receiver array 65 through the receiver lens 61.

Figure 3:
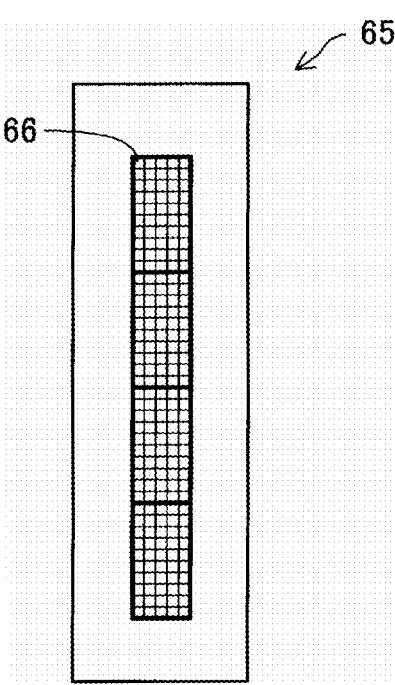
FIG. 3 is a diagram illustrating a schematic configuration of a receiver array.
Figure 4:
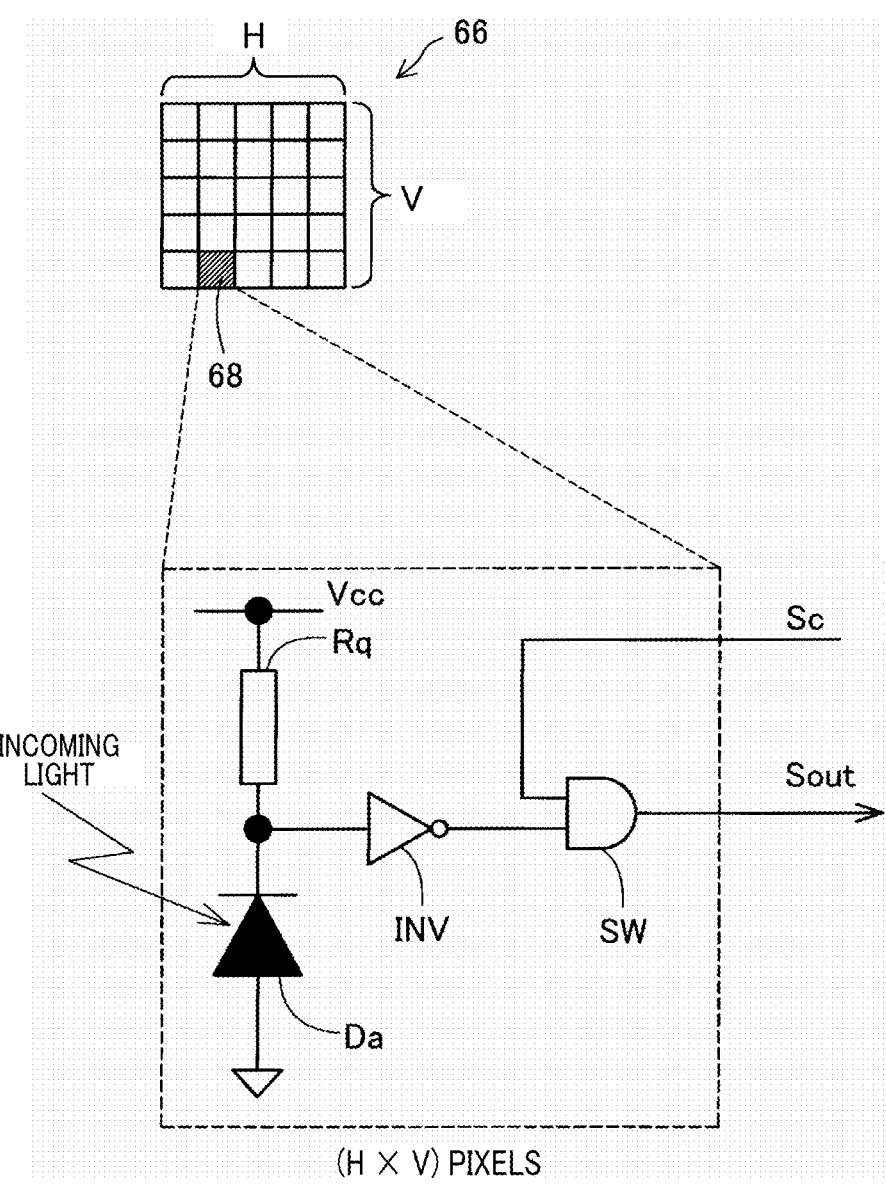
FIG. 4 is a diagram illustrating a schematic configuration of a light receiver included in a pixel.

As illustrated in FIG. 3, the receiver array 65 is comprised of a plurality of pixels 66 that are two-dimensionally arranged. Each pixel 66 is, as illustrated in FIG. 4, comprised of a plurality of light receivers 68 that constitutes a receiver-element array comprised of (H×V) receiver elements in the horizontal and vertical directions. Reference character H, which is an integer greater than or equal to 1, represents the number of receiver elements in the horizontal direction, and reference character V, which is an integer greater than or equal to 1, represents the number of receiver elements in the vertical direction. Each of the horizontal and vertical receiver-element numbers H and Vis set to 5 in the exemplary embodiment, so that each pixel 66 is comprised of (5×5) receiver elements in the horizontal and vertical directions.

Any number of light receivers 68 can constitute each pixel 66, and therefore a single light receiver 68 can constitute each pixel 66. The number, i.e., the (H×V), of light receivers 68, which constitutes each pixel 66, will also be referred to as a pixel size. The exemplary embodiment employs a single photon avalanche photodiode (SPAD) as each light receiver 68, but can employ another type of a receiver element, such as a PIN photo diode. Information resulting from the reception of light by each pixel 66 becomes a light intensity of a corresponding one of the partitioned pixels of the view region 80. As seen by the above descriptions, the pixels 66 constituting the receiver array 65 are hardware components, and therefore used as a different meaning of the partitioned pixels constituting the view region 80. Because the information resulting from the reception of light by each pixel 66 becomes the light intensity of the corresponding one of the partitioned pixels of the view region 80, each pixel 66 has a correlative relationship with the corresponding one of the partitioned pixels of the view region 80.

Each of the light receivers 68 is comprised of an avalanche photodiode Da, a quench resistor device Rq, an inverter INV, and an AND circuit SW having a pair of first and second input terminals. Specifically, each light receiver 68 is configured such that the avalanche photodiode Da and the quench resistor device Rq are connected in series between a power source Vcc and a grounded line, and a connection point between the avalanche photodiode Da and the quench resistor device Rq is connected to an input terminal of the inverter INV This configuration of each light receiver 68 enables a predetermined level of voltage at the connection point to be inputted to the inverter INV. This results in an inverted level of voltage being outputted from the inverter INV as a digital signal, i.e., a high-level signal or a low-level signal. The digital signal is inputted to the first input terminal of the AND circuit SW.

To the second input terminal of the AND circuit SW, a selection signal Sc is inputted. The selection signal Sc determines an output timing of an output signal Sout, i.e., the digital signal, which reflets the state of the avalanche photodiode Da, from the AND circuit SW. Specifically, changing the level of the selection signal Sout inputted to the second input terminal of the AND circuit SW of each light receiver 68 from a low level to a high level causes the output signal Sout, which reflets the state of the avalanche photodiode Da, to be outputted from the corresponding light receiver 68.

A duration of the selection signal Sc being in the high level corresponds to a time of flight (TOF) Tf for each light receiver 68 defined between the emission of light pulses and the reception of at least one echo pulse causally related to at least one of the emitted light pulses.

The emission of one or more light pulses from the light emitter 40 and the reception of at least one echo pulse causally related to at least one of the emitted light pulses by each light receiver 68 will be referred to as light-pulse transceiver sequence. That is, the TOF Tf represents a duration of the light-pulse transceiver sequence. One light-pulse transceiver sequence corresponds to one frame of the data assembly representing the distribution of received light intensity levels in the view region 80.

The selection signal Sc is changed from the low level to the high level each time the TOF Tf of one light-pulse transceiver sequence has elapsed.

The output signal Sout outputted from each light receiver 68 is a pulse signal based on received incoming light including (i) at least one echo pulse, which results from the reflection of at least one of the emitted one or more light pulses by an outside object OBJ located in the scanning region returns to the corresponding light receiver 68, and (ii) disturbance light. The output signals Sout for the respective values of the TOF Tf, which are received by each light receiver 68, are successively inputted to the determination processor 100.

Figure 5:
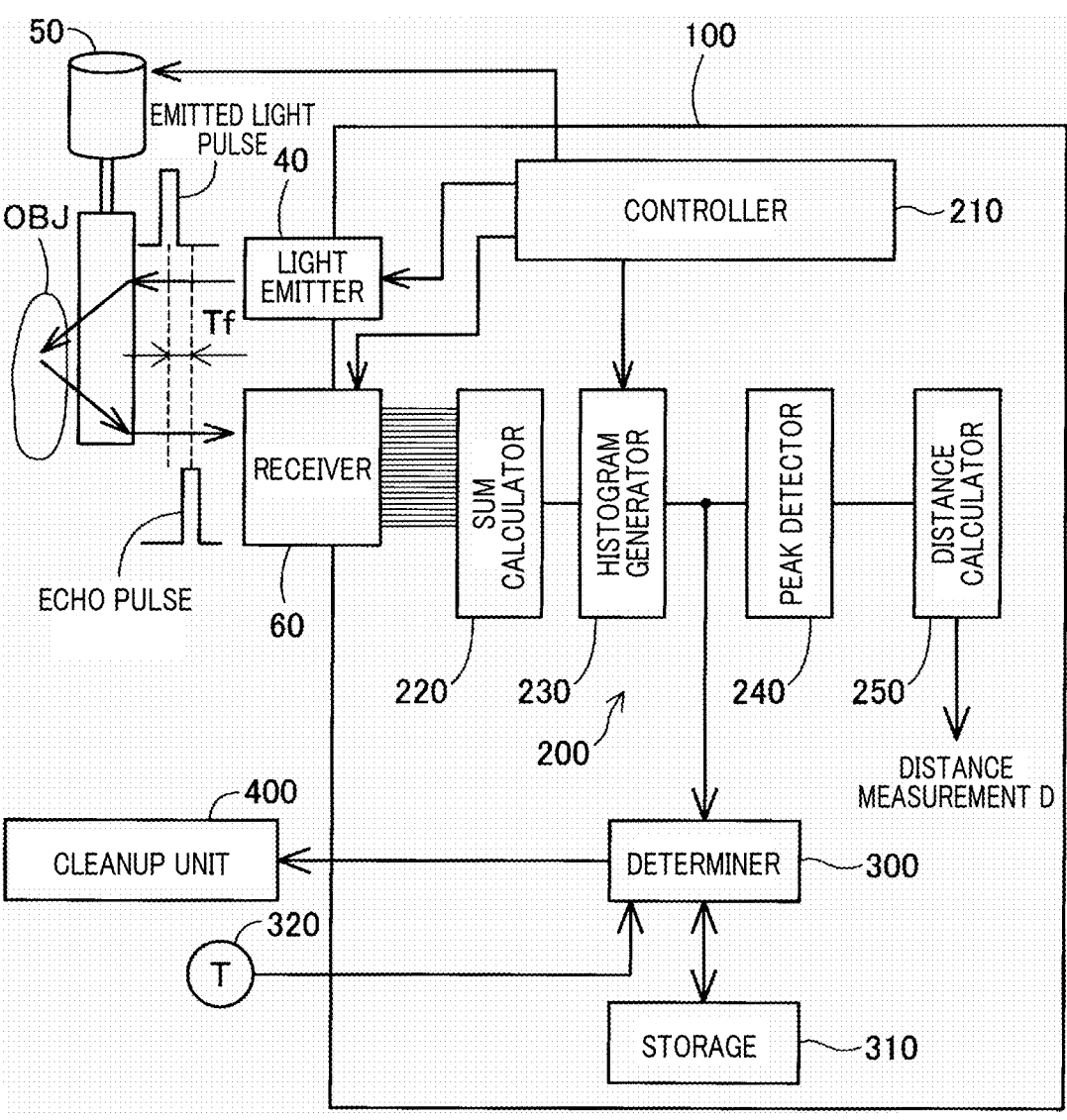
FIG. 5 is a block diagram illustrating a schematic configuration of a determination processor.

Referring to FIG. 5, the determination processor 100 includes a calculator 200, a determiner 300, and a storage 310. The calculator 200 is configured to calculate the distance of the outside object OBJ from the distance measuring apparatus 20 in accordance with the TOF Tf of each light-pulse transceiver sequence based on echo pulses, each of which results from reflection of a corresponding one of the emitted light pulses by the outside object OBJ.

Specifically, the calculator 200 includes a controller 210, a sum calculator 220, a histogram generator 230, a peak detector 240, and a distance calculator 250. The controller 210 performs overall control of the determination processor 100.

The sum calculator 220 is configured to receive the output signals Sout from at least some of the light receivers 68 of each pixel 66 constituting the receiver array 65, and calculates, as a sum result, the number of the received output signals Sout for each pixel 66. Each light receiver 68 is configured to operate in response to receiving an incoming light pulse. As described above, an SPAD is used as each light receiver 68, and the plural light receivers 68, i.e., the plural SPADs, constitute each pixel 66. An SPAD is capable of responding to a single photon when the single photon is inputted to the SPAD to accordingly detect the single photon. Because the responding of such an SPAD to a single photon occurs probabilistically, each light receiver 68 probabilistically detects an incoming light pulse to thereby output the output signal Sout.

The sum calculator 220 is configured to receive, for each light-pulse transceiver sequence, the output signals Sout outputted from at least some of the light receivers 68 of each pixel 66, and calculate, for each light-pulse sequence, the number of the received output signals Sout as the sum result. Then, the sum calculator 220 is configured to output, for each light-pulse transceiver sequence, the calculated sum result to the histogram generator 230.

The histogram generator 230 is configured to generate, based on the sum results outputted from the sum calculator 220, a histogram representing an intensity level of the received incoming light for each light-pulse transceiver sequence, i.e., for each TOF 7*f*. Then, the histogram generator 230 is configured to output the histogram for each pixel 66 to the peak detector 240.

The histogram generated by the histogram generator 230 for each pixel 66 is a graph of bars; the height of each bar represents a corresponding light intensity level, and the width of each bar represents a class interval corresponding to one of the values of the TOF Tf. The light intensity level for each value of the TOF Tf included in the histogram is the number of the output signals Sout, i.e., the number of light-received light receivers (SPADs) in all the light receivers 68.

The peak detector 240 is configured to analyze the light intensity levels of the histogram for each pixel 66 outputted from the histogram generator 230 to accordingly detect at least one peak, i.e., at least one peak light-intensity level, in all the light intensity levels of the histogram for the corresponding pixel 66. Then, the peak detector 240 is configured to detect at least one class interval, i.e., at least one value of the TOF Tf, corresponding to the detected at least one peak in the histogram for each pixel 66.

The distance calculator 250 is configured to calculate, based on the at least one value of the TOF Tf of at least one echo pulse, the distance of the outside object OBJ from the distance measuring apparatus 20.

The determiner 300 is configured to perform a dirt determination routine for the window 92 in accordance with information indicative of a light intensity received by the receiver 60 to thereby determine whether there is dirt on the window 92. The determiner 300 of the exemplary embodiment is configured to use, as the information indicative of the light intensity received by the receiver 60, the histogram for each pixel 66 generated by the histogram generator 230. The dirt determination routine will be described later.

The determiner 300 is configured to instruct the cleanup unit 400 to perform a dirt removal task of removing dirt on the window 92 in response to determining that there is dirt on the window 92.

Additionally, the distance measuring apparatus 20 includes a temperature sensor 320 connected to the determiner 300. The temperature sensor 320 is configured to measure an outside-air temperature. The temperature sensor 320 can be omitted.

The storage 310 stores a distribution of values of a threshold setting parameter previously determined for the respective pixels in the view region 80; the values of the threshold setting parameter are used for respectively setting intensity thresholds used in the dirt determination routine. The values of the threshold setting parameter and the intensity thresholds will be described later.

Figure 6:
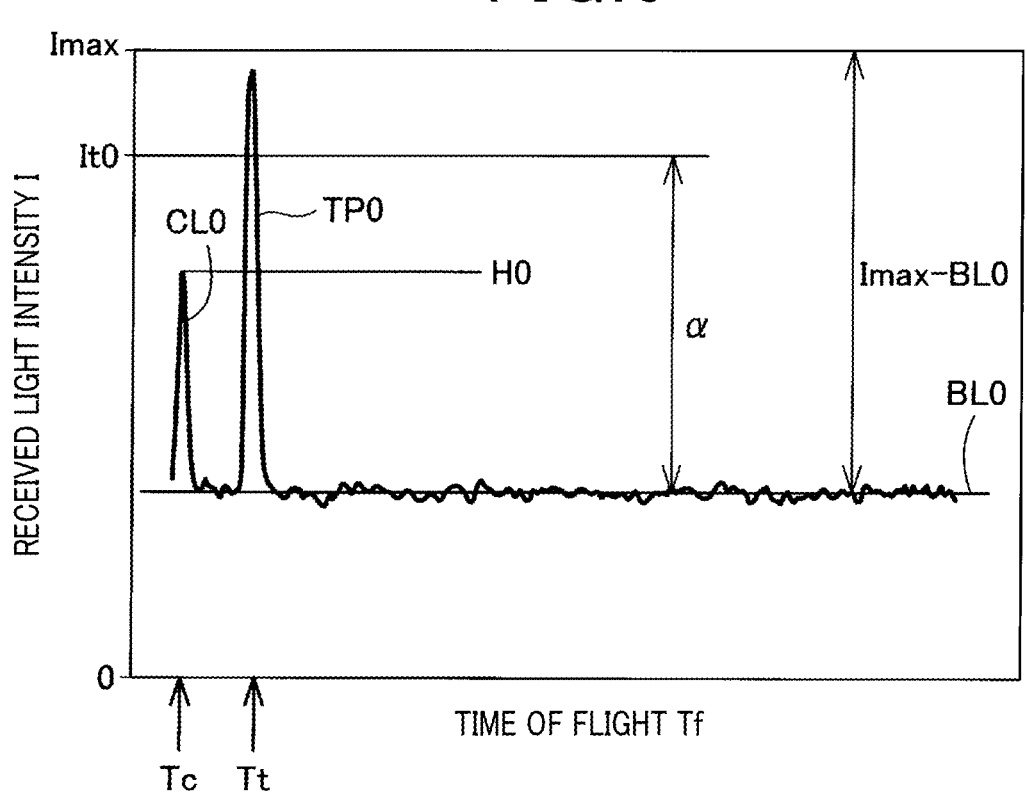
FIG. 6 is a graph illustrating an example of an initial histogram where no dirt is adhered to a window.
Figure 7:
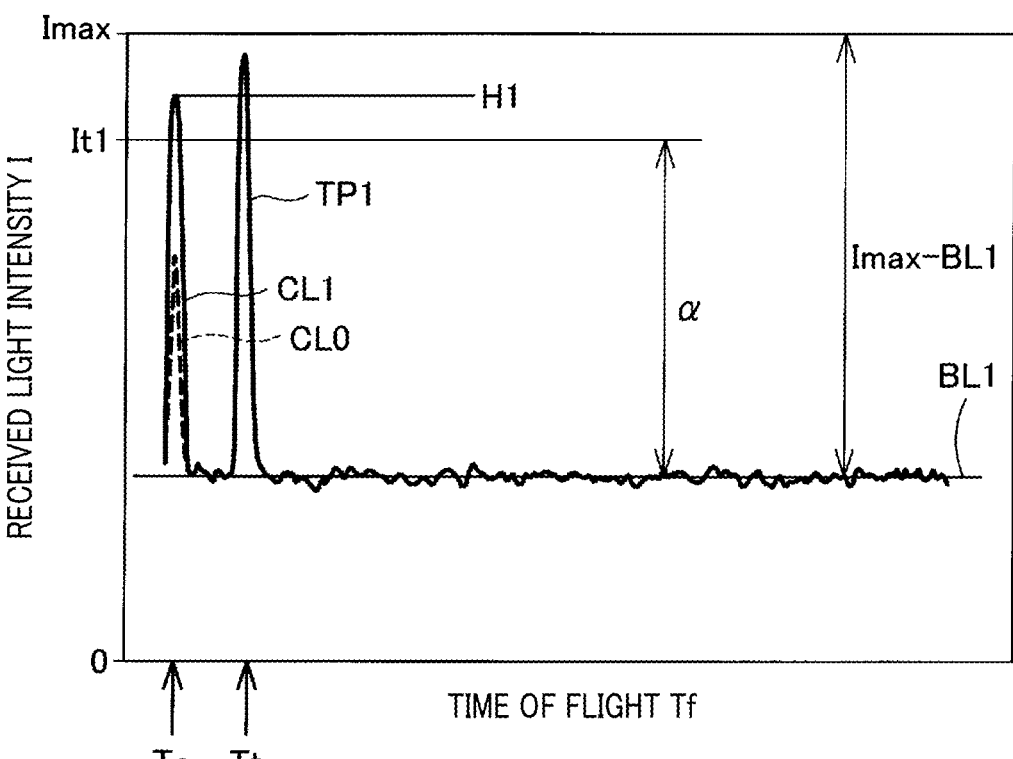
FIG. 7 is a graph illustrating an example of a histogram generated during execution of a dirt determination routine.

The histogram for each pixel 66 generated by the histogram generator 230 is, as illustrated in each of FIGS. 6 and 7, a graph of bars; the height of each bar represents a corresponding light intensity level I, and the width of each bar represents a class interval corresponding to one of the values of the TOF Tf.

FIG. 6 represents an example of the histogram generated in an initial state of the window 92 where no dirt is adhered to the window 92. In contrast, FIG. 7 represents an example of the histogram generated during execution of the dirt determination routine. In each of FIGS. 6 and 7, each reference character, to which 0 is suffixed, is a histogram parameter in the initial state of the window 92, and each reference character, to which 1 is suffixed, is a histogram parameter during execution of the dirt determination routine.

The following mainly describes the meaning of each histogram parameter illustrated in FIG. 7.

Reference character CL1 represents a peak, i.e., a peak light-intensity level, in the histogram illustrated in FIG. 7; the peak light-intensity level appears at a previously specified value Tc of the TOF Tf corresponding to the length of a light path defined from the light emitter 40 to the window 92. A reflected light pulse or echo pulse resulting from reflection of at least one emitted light pulse by the window 92 will be referred to as a clutter light pulse. Reference character CL0 is used in the histogram illustrated in FIG. 6 for the same manner as reference character CL1.

Reference character TP1 represents a target peak, i.e., a target peak light-intensity level, in the histogram illustrated in FIG. 7; the target peak is based on an echo pulse resulting from reflection of an emitted light pulse by the outside object OBJ. Reference character TP0 is used in the histogram illustrated in FIG. 6 for the same manner as reference character TP1.

Reference character Tt represents a value of the TOF Tf related to each target peak TP0, TP1, which corresponds to the distance from the light emitter 40 to the outside object OBJ.

Reference character Imax represents a predetermined maximum level that the sum of the light intensity levels I of each pixel 66 is able to reach. Specifically, the maximum level Imax for each pixel 66 is defined as the number of light receivers 68 constituting the corresponding pixel 66. As described above with reference to FIG. 4, each pixel 66 is comprised of the (H×V) of light receivers 68.

If the histogram generator 230 generates, for each pixel 66, the histogram based on the output signals Sout for each of the N times of execution of the light-pulse transceiver sequences (N is an integer greater than or equal to 2), the maximum Imax that the sum of the light intensity levels I of each pixel 66 can reach is equal to the product of (N×H×V).

Reference character H1 is a clutter peak level representing an absolute light-intensity level of the clutter peak CL1 in the histogram illustrated in FIG. 7. The clutter peak level H1 will also be referred to as a peak level H1 or a received light-intensity level H1. Reference character H0 is used in the histogram illustrated in FIG. 7 for the same manner as reference character H1.

Reference character It1 is an intensity threshold for the clutter peak CL1, which is used for determination of whether a first condition is satisfied. The first condition is that the light intensity level at the specified value Tc of the TOF Tf in the histogram for at least one pixel 66 is larger than or equal to the intensity threshold It1. The intensity threshold It1 is typically set to be lower than the maximum level Imax, but can be set to be equal to the maximum level Imax. How to determine the intensity threshold It1 during execution of the dirt determination routine will be described later. Reference character It0 is used in the histogram illustrated in FIG. 6 for the same manner as reference character It1.

Reference character BL1 represents a baseline level of the histogram illustrated in FIG. 7; the baseline level BL1 of the histogram illustrated in FIG. 7 is an average level of all the light intensity levels except for the peak light-intensity levels CL1 and TP1. Reference character BL0 is used in the histogram illustrated in FIG. 6 for the same manner as reference character BL1.

Reference character a represents a threshold setting parameter in the histogram illustrated in FIG. 7 for each pixel in the view region 80. The threshold setting parameter in the histogram illustrated in FIG. 7 is for example obtained by subtracting the baseline level BL1 from the intensity threshold It1. In other words, the intensity threshold It1 in the histogram illustrated in FIG. 7 for each pixel 66 can be determined based on the sum of a value of the threshold setting parameter and the baseline level BL1. The intensity threshold It1 in the histogram illustrated in FIG. 7 for each pixel 66 can also be determined in one of the other methods described later.

The expression (Imax–BL1) used in the histogram illustrated in FIG. 7 represents an effective intensity-level width, which is a value obtained by subtracting the baseline level BL1 from the maximum level Imax. The expression (Imax–BL0) used in the histogram illustrated in FIG. 6 is substantially identical to the expression (Imax–BL1) used in the histogram illustrated in FIG. 7.

The target peak TP0, which is based on an echo pulse resulting from reflection of an emitted light pulse by the outside object OBJ, appears in the typical histogram illustrated in FIG. 6, which is generated in the initial state of the window 92 where no dirt is adhered to the window 92. This enables the distance of the outside object OBJ from the distance measuring apparatus 20 to be measured as a function of a value Tt of the TOF Tf related to the target peak TP0 in the histogram illustrated in FIG. 6.

Additionally, the clutter peak CL0, which is based on an echo pulse resulting from reflection of an emitted light pulse by the window 92, appears in the typical histogram illustrated in FIG. 6. As described above, the clutter peak CL0 represents the peak light-intensity level appearing at the previously specified value Tc of the TOF Tf corresponding to the length of the light path defined from the light emitter 40 to the window 92.

As described above, the clutter peak CL0 has the peak level H0, which will be referred to as an initial clutter peak level H0, representing an absolute light-intensity level of the clutter peak CL0 in the histogram illustrated in FIG. 6 in the initial state of the window 92 in which no dirt is adhered to the window 92, i.e., in a factory default state of the apparatus 20.

The specified values Tc of the TOF Tf, at each of which the corresponding clutter peak CL0 appears, are different from one another for the respective individual locations of the pixels in the view region 80. This is because the length of the light path from the light emitter 40 to the window 92 through the location of any pixel in the view region 80 is different from that through the location of another pixel in the view region 80.

Similarly, the initial clutter peak levels H0 of the respective clutter peaks CL0 are typically different from one another for the respective individual locations of the pixels in the view region 80.

It is unnecessary for typical distance measuring apparatuses to obtain a measured light-intensity level of an echo pulse at the specified value Tc of the TOF Tf at which the clutter peak CL1 appears, because the typical distance measuring apparatuses has no attention to the location of the window 92 as the measurement target thereof.

In other words, the exemplary embodiment has a feature of obtaining a measured light-intensity level of an echo pulse at the specified value Tc of the TOF Tf for determining, using the clutter peak CL1, whether there is dirt on the window 92.

The example of the histogram illustrated in FIG. 7 shows that

1. The level of the target peak TP1 during execution of the dirt determination routine is usually different from the level of the target peak TP0 in the initial state of the window 92
2. The level of the clutter peak CL1 during execution of the dirt determination routine is usually different from the level of the clutter peak CL2 in the initial state of the window 92

For example, dirt adhered to the window 92 is likely to cause the clutter peak level H1 to be higher than the initial clutter peak level H0. Dirt adhered to the window 92 is likely to cause the level of the target peak TP1 based on an echo pulse from the outside object OBJ to be lower than the target peak TP0 based on an echo pulse from the same outside object OBJ.

The baseline level BL1 during execution of the dirt determination routine may fluctuate depending on an external environment in which the distance measuring apparatus 20 is located; the external environment includes whether there is external light radiated from an external light source, such as the sun. For example, strong light radiated from the sun included in the external environment may cause the baseline level BL1 to become extremely higher, and similarly the clutter peak level H11 to become higher like the baseline level BL1.

From this viewpoint, it is preferably to adaptively determine the intensity threshold It1 during execution of the dirt determination routine in accordance with influence from the external environment. How to adaptively determine the intensity threshold It1 will be described later.

For example, the exemplary embodiment provides the following methods A, B, and C for determining the intensity threshold It1.

First, the following describes the first method A for determining the intensity threshold It1.

The first method A determines the intensity threshold It1 during execution of the dirt determination routine at a constant level. Specifically, the first method A can determine, for all the pixels within the view region 80, the intensity threshold It1 within the view region 80 during execution of the dirt determination routine at a common constant level, or can determine, for each of the pixels within the view region 80, the intensity threshold It1 within the view region 80 during execution of the dirt determination routine at an individual constant level. The common constant level of the intensity threshold It1 for all the pixels within the view region 80 can be stored in the storage 310 as a value of a threshold setting parameter α. The individual constant levels of the intensity threshold It1 for the respective pixels within the view region 80 can be stored in the storage 310 as values of the first threshold setting parameter α.

Determining the intensity threshold It1 at the common constant level for all the pixels within the view region 80 enables the storage 310 to be eliminated. In contrast, determining the intensity threshold It1 at the individual constant levels for the respective pixels within the view region 80 enables the determined constant levels of the intensity threshold It1 for the respective pixels within the view region 80 to be higher than the initial clutter peak level H0. This makes it possible to perform the dirt determination routine more precisely.

Next, the following describes the second method B for determining the intensity threshold It1.

The second method B adds the baseline level BL1 of the histogram illustrated in FIG. 7 to a fixed level as the first threshold setting parameter α to thereby determine the intensity threshold It1 during execution of the dirt determination routine in accordance with the following expression (1):

$$It1 = BL1 + \alpha \qquad (1)$$

The first threshold setting parameter α is set to a previously determined level such that the sum of the baseline level BL1 and the previously determined level of the first threshold setting parameter α is sufficiently larger than the initial clutter peak level H0.

A common single level can be determined as the first threshold setting parameter α for all the pixels within the view region 80. Alternatively, individual levels can be determined as the first threshold setting parameter α for the respective pixels within the view region 80; the individual levels of the first threshold setting parameter α for the respective pixels within the view region 80 can be stored in the storage 310.

The second method B makes it possible to adaptively determine a value of the intensity threshold It1 during execution of the dirt determination routine in accordance with influence from the external environment in which the distance measuring apparatus 20 is located; the external environment includes, for example, whether there is external light radiated from an external light source.

The first threshold setting parameter α for each pixel 66 can be determined in accordance with the pixel size (H×V) or the N times of execution of the light-pulse transceiver sequences. For example, the first threshold setting parameter α for each pixel 66 can be determined in accordance with the following expressions (1A) to (1C):

$$\alpha = \alpha 0 \times (H \times V) \qquad (1A)$$

$$\alpha = \alpha 0 \times N \qquad (1B)$$

$$\alpha = \alpha 0 \times (H \times V) \times N \qquad (1C)$$

where:

α0 is a previously determined constant value; and the pixel size (H×V) represents the number of light receivers, i.e., SPADs, 68 constituting each pixel 66.

Additionally, the following describes the third method C for determining the intensity threshold It1.

The third method C calculates the product of the effective intensity-level width (Imax−BL0) and a second threshold setting parameter β, and adds the calculated product to the baseline level BL1 to thereby determine the intensity threshold It1 during execution of the dirt determination routine in accordance with the following expression (2):

$$It1 = (Imax - BL0) \times \beta + BL1 \qquad (2)$$

The second threshold setting parameter β is set to a previously determined level such that the calculated result {(Imax−BL0)×β+BL1} in accordance with the expression (2) is sufficiently larger than the initial clutter peak level H0.

A common single level can be determined as the second threshold setting parameter β for all the pixels within the view region 80. Alternatively, individual levels can be determined as the second threshold setting parameter β for the respective pixels within the view region 80; the individual levels of the second threshold setting parameter β for the respective pixels within the view region 80 can be stored in the storage 310.

Like the second method B, the third method C makes it possible to adaptively determine a value of the intensity threshold It1 during execution of the dirt determination routine in accordance with influence from the external environment in which the distance measuring apparatus 20 is located; the external environment includes, for example, whether there is external light radiated from an external light source.

Additionally, the third method C maintains a value of the intensity threshold It1 during execution of the dirt determination routine to be smaller than the maximum level Imax even if the baseline level BL1 increases due to extremely strong external light. This therefore makes it possible to perform the dirt determination routine more precisely.

As described above, if the values of the first threshold setting parameter α or the second threshold setting parameter β for the respective pixels within the view region 80 are individually determined, a distribution of the individually determined values of the first threshold setting parameter α or the second threshold setting parameter β within the view region 80 can be stored in the storage 310.

The values of the first threshold setting parameter α or the second threshold setting parameter β are preferably stored in the storage 310 to correlate with all the respective pixel locations within the view region 80, but selected values of the first threshold setting parameter α or the second threshold setting parameter β can be stored in the storage 310 to respectively correlate with corresponding selected pixel positions within the view region 80. This results in a distribution of the selected values of the first threshold setting parameter α or the second threshold setting parameter β in the view region 80 being stored in the storage 310.

If the selected values of the first threshold setting parameter α or the second threshold setting parameter β are stored in the storage 310 to respectively correlate with the corresponding selected pixel positions within the view region 80, the remaining values of the first threshold setting parameter α or the second threshold setting parameter β for respective unselected pixel positions within the view region 80 can be interpolated based on the selected values of the first threshold setting parameter α or the second threshold setting parameter β.

This makes it possible to determine the values of the first threshold setting parameter α or the second threshold setting parameter β for the respective unselected pixel positions within the view region 80 based on interpolation of the selected values of the first threshold setting parameter α or the second threshold setting parameter β stored in the storage 310, thus calculating a value of the intensity threshold It1 for each of the pixel positions within the view region 80.

Figure 8:
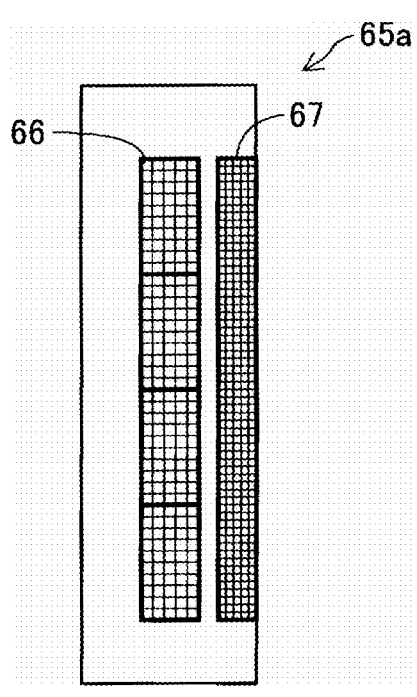
FIG. 8 is a diagram illustrating a schematic configuration of a receiver array comprised of pixels used for dirt detection.

As illustrated in FIG. 8, the receiver 65 can include a receiver array 65*a* comprised of a plurality of pixels 67 used for dirt detection in addition to the pixels 66 used for distance measurement. Specifically, the receiver 60 can include the receiver array 65 comprised of the pixels 67 for dirt detection in addition to the pixels 66 used for distance measurement. The pixels 67 used for dirt detection are located adjacent to the pixels 66 for distance measurement. Specifically, the pixels 67 used for dirt detection are preferably arranged in a predetermined region where (i) no clutter light is applied if no dirt is adhered to the window 92 and (ii) clutter light is applied if dirt is adhered to the window 92.

Dirt adhered to the window 92 may increase a clutter peak in each pixel 66 used for distance measurement, and increase clutter light around the pixels 66 used for distance measurement. Locating the pixels 67 for dirt measurement adjacently around the pixels 66 enables determination of whether light is inputted to the pixels 67 to thereby determine whether dirt is adhered to the window 92. This offers simpler determination of whether dirt is adhered to the window 92.

Figure 9:
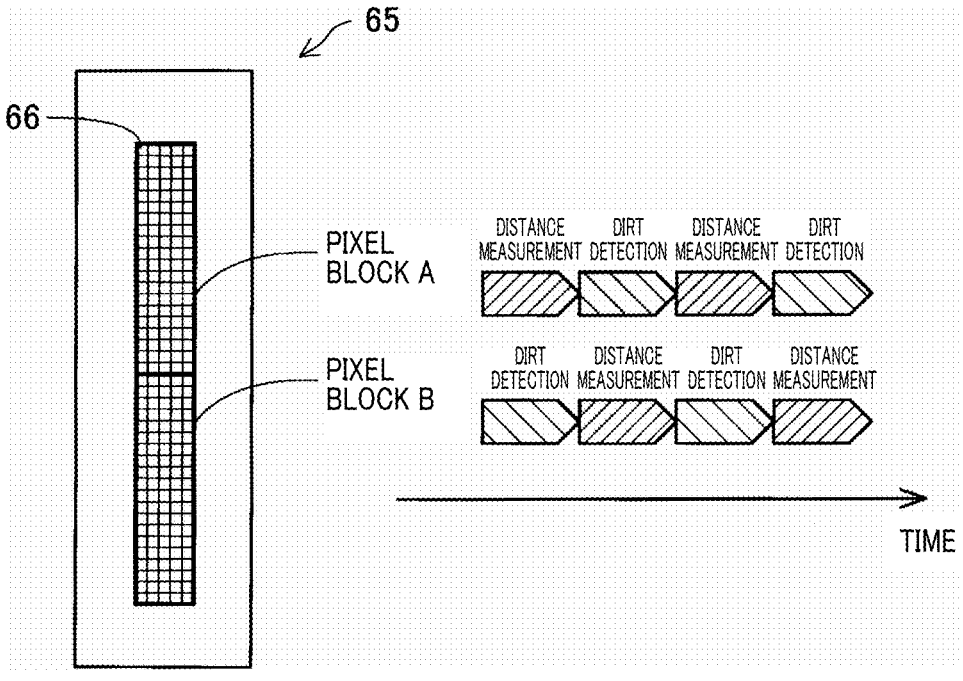
FIG. 9 is a diagram illustrating that distance measurement and dirt detection are alternately carried out for each of divided pixel blocks.

Additionally, as illustrated in FIG. 9, the pixels 66 included in the receiver array 65 are categorized into divided pixel blocks, and at least one of the divided pixel blocks performs distance measurement and at least another of the divided pixel blocks performs dirt detection simultaneously.

For example, FIG. 9 illustrates that, as an example, the pixels 66 are divided into a pixel block A and a pixel block B. One of the pixel blocks A and B alternately performs distance measurement and dirt detection, and the other of the pixel blocks A and B complementarily and alternately performs dirt detection and distance measurement. The pixels 66 can be divided into three or more pixel blocks. In this modification, at least one of the pixel blocks can perform dirt detection, and the at least one remaining pixel block can perform distance measurement.

Figure 10:
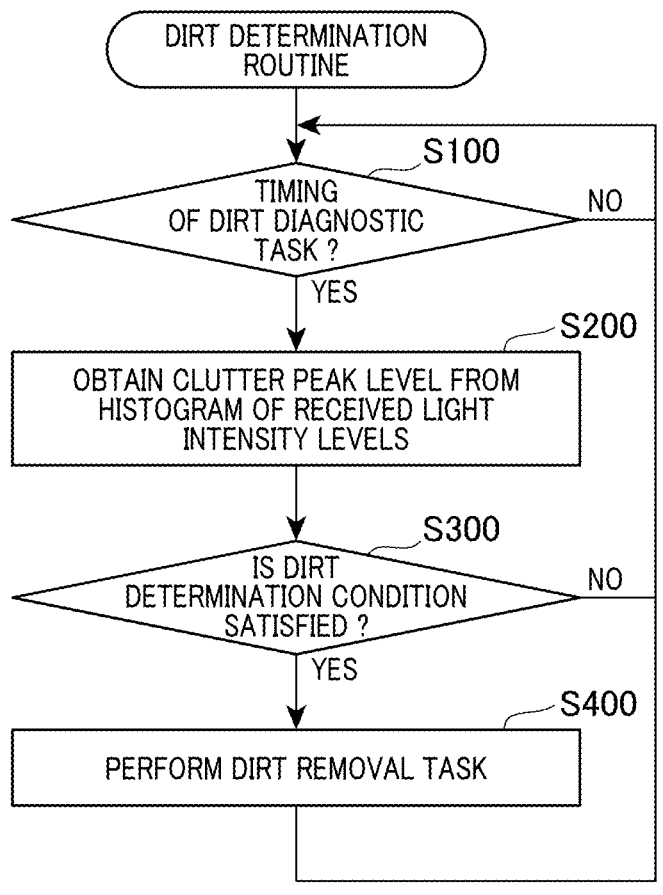
FIG. 10 is a flowchart illustrating a procedure of a dirt determination routine.

The determiner 300 is configured to cyclically perform the dirt determination routine illustrated in FIG. 10 under control of the controller 210.

In step S100 of a current cycle of the dirt determination routine, the determiner 300 determines whether it is time to perform a dirt diagnostic task. For example, the determiner 300 is programmed to determine that it is time to perform the dirt diagnostic task every predetermined period while the distance measuring apparatus 20 is performing the normal distance measurement task. Alternatively, the determiner 300 is programmed to determine a predetermined start time of performing the dirt diagnostic task during each period of self-diagnosis of the distance measuring apparatus 20.

In response to determination that it is time to perform the dirt diagnostic task (YES in step S100), the determiner 300 obtains, from the histogram of the light intensity levels, the peak level H1 of the clutter peak CL1 in step S200.

Next, the determiner 300 determines whether a predetermined dirt determination condition is satisfied in step S300. In response to determination that the dirt determination condition is not satisfied (NO in step S300), the determiner 300 terminates the current cycle of the dirt determination routine, and waits for the next cycle of the dirt determination routine. Otherwise, in response to determination that the dirt determination condition is satisfied (YES in step S300), the current cycle of the dirt determination routine proceeds to step S400.

The determiner 300 is, for example, programmed to use, as the dirt determination condition, any one of the following dirt determination conditions I, II, and III.

The dirt determination condition I is satisfied so that it is determined that dirt is adhered to the window 92 in step S300 if the following first condition C1 is only satisfied.

The first condition C1 is that the clutter peak level, i.e., the received light-intensity level, H1 at the previously specified value Tc of the TOF Tf for at least one pixel in the view region 80, which corresponds to at least one pixel 66, is larger than or equal to a value of the intensity threshold It1; the previously specified value of the TOF Tf corresponds to the length of the light path defined from the light emitter 40 to the window 92.

Because the dirt determination condition I is a relatively laxer condition, i.e., a relatively more reduced condition as compared with the other determination conditions II and III, the dirt determination condition I provides an advantage of lowering a possibility of missing dirt on the window 92. The determiner 300 is preferably configured to determine whether the first condition C1 is satisfied independently of whether the histogram for the at least one pixel in the view region 80 includes the target peak TP1. This preferable configuration provides an advantage of detecting dirt on the window 92 even if the histogram for the at least one pixel in the view region 80 includes the target peak TP1.

The dirt determination condition II is satisfied so that it is determined that dirt is adhered to the window 92 in step S300 if both the above first condition C1 and the following second condition C2*a* are satisfied.

The second condition C2*a* is that the number of selected pixels in the view region 80 is greater than or equal to a predetermined number threshold that is defined as an integer greater than or equal to 2; the clutter peak level H1 at the previously specified value Tc of the TOF Tf for each of the selected pixels in the view region 80 is larger than or equal to a value of the intensity threshold It1; the value of the intensity threshold It1 corresponding to each of the selected pixels of the view region 80.

The dirt determination condition II enables determination that there is dirt on the window 92 in response to determination that the number of selected pixels in the view region 80 is greater than or equal to the predetermined number threshold; the clutter peak level H1 at the previously specified value Tc of the TOF Tf for each of the selected pixels in the view region 80 is larger than or equal to a value of the intensity threshold It1 (see FIG. 7). This therefore provides an advantage of more reliable determination of whether there is dirt on the window 92.

The dirt determination condition III is satisfied so that it is determined that dirt is adhered to the window 92 in step S300 if both the above first condition C1 and the following third condition C2*b* are satisfied.

The third condition C2*b* is that the number of selected pixels in the view region 80 is greater than or equal to the predetermined number threshold and the selected pixels are successively adjacent to each other to constitute a pixel assembly; the clutter peak level H1 at the previously specified value Tc of the TOF Tf for each of the selected pixels in the view region 80 is larger than or equal to a value of the intensity threshold It1.

Figure 11:
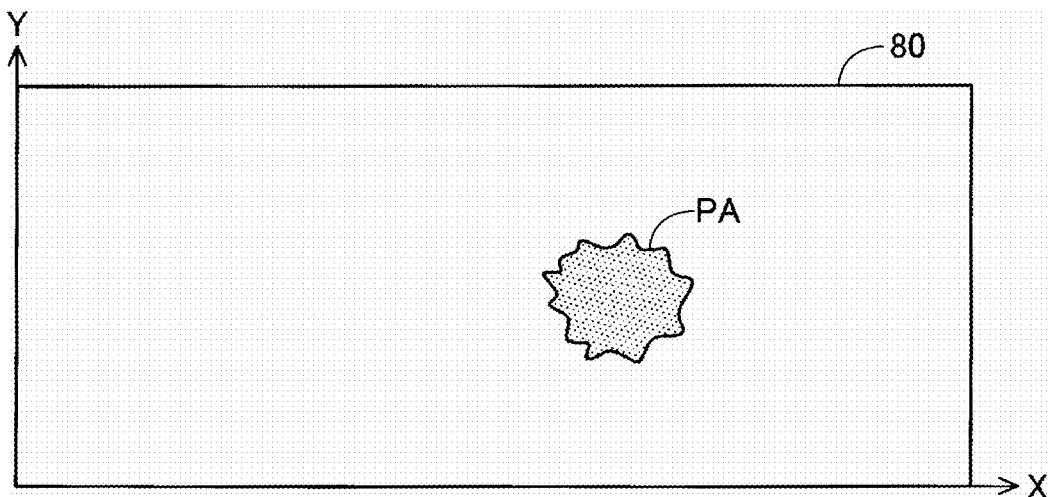
FIG. 11 is a view illustrating dirt on an area of a window; the area corresponds to a pixel assembly in a view region.

The dirt determination condition III is defined to address an example situation, which is illustrated in FIG. 11, where the selected pixels within the view region 80 are successively adjacent to each other to constitute a pixel assembly PA; the clutter peak level H1 at the previously specified value Tc of the TOF Tf for each of the selected pixels in the view region 80 is larger than or equal to a value of the intensity threshold It1; the value of the intensity threshold It1 corresponding to each of the selected pixels of the view region 80.

In the exemplary embodiment, pixels are successively adjacent to each other represents that any one of the pixels is located at an upper adjacent position of at least one of the remaining pixels or at a lower adjacent position of at least one of the remaining pixels, or a left-side adjacent position of at least one of the remaining pixels, or a right-side adjacent position of at least one of the remaining pixels.

Because dirt is likely to be adhered to a certain size of area on the window 92, dirt on the window 92 is likely to cause the selected pixels within the view region 80, which are successively adjacent to each other, to constitute the pixel assembly PA (see FIG. 11); the clutter peak level H1 at the previously specified value Tc of the TOF Tf for each of the selected pixels in the view region 80 is larger than or equal to a value of the intensity threshold It1. For this reason, the dirt determination condition III provides an advantage of still more reliable determination of whether there is dirt on the window 92 as compared with the dirt determination condition II.

As an example, the determiner 300 can be programmed to determine whether the dirt determination condition is satisfied in step S300 for each of successive plural frames. Let us assume that L is defined as an integer greater than or equal to 2. In this assumption, the determiner 300 can be programmed to determine that dirt is adhered to the window 92 in response to determination that the dirt determination condition is satisfied for each of the successive L frames.

As another example, let us assume that L is defined as an integer greater than or equal to 3, and M is defined as an integer greater than or equal to 2 and less than or equal to L. In this assumption, the determiner 300 can be programmed to determine that dirt is adhered to the window 92 in response to determination that the dirt determination condition is satisfied for each of the M frames included in the successive L frames.

As a further example, let us assume that L is defined as an integer greater than or equal to 2. In this assumption, the determiner 300 can be programmed to determine whether dirt is adhered to the window 92 in accordance with (i) the sum, i.e., the total, or average of the clutter peak levels H1 for the respective successive L frames and (ii) the sum or average of values of the intensity threshold It1 for the respective successive L frames. Employing one of the above examples enables stable determination of whether there is dirt on the window 92, making it possible to prevent erroneous determination that there is dirt on the window 92.

As described above, in response to affirmative determination in step S300, the determiner 300 instructs the cleanup unit 400 to perform the dirt removal task.

Specifically, as the dirt removal task, at least one of the first and second washers 410 and 411 of the cleanup unit 400 delivers a jet of water or air to the outer surface of the window 92 to accordingly remove dirt on the outer surface of the window 92 therefrom.

If the outside-air temperature measured by the temperature sensor 320 points to the possibility of snow and/or ice being adhered to the outer surface of the window 92, the heater 420 of the cleanup unit 400 energizes the heater wire located along the inner surface of the window 92 to cause the heater wire to generate heat that heats the window 92. This enables snow and/or ice adhered to the outer surface of the window 92 to melt.

The determiner 300 can be configured to select at least one of the above devices 411, 412, and 420, and instruct the selected at least one of the devices 411, 412, and 420 to perform a corresponding at least one of the above cleanup tasks.

For example, the determiner 300 can be configured to select, in accordance with the location of dirt on the outer surface of the window 92, one of the first and second washers 410 and 420, which clean up respective different regions on the outer surface of the window 92, and instruct the selected one of the first and second washers 410 and 420; the dirt on the outer surface of the window 92 lies in the region covered by the selected one of the first and second washers 410 and 420.

The first and second washers 410 and 420 can be located adjacent to a selected side in all the sides of the outer surface of the window 92, and the first washer 410 has a slower rate of delivery of fluid than that of the second washer 420, and therefore has a lower dirt removal ability than that of the second washer 420. In this modification, the determiner 300 is configured to (i) Select the first washer 410 and instruct the selected first washer 410 to perform the dirt removal task if dirt on the outer surface of the window 92 lies closer to the selected side of the outer surface of the window 92

(ii) Select the second washer 420 and instruct the selected second washer 420 to perform the dirt removal task if dirt on the outer surface of the window 92 lies closer to one of the remaining sides, which is opposite to the selected side, of the outer surface of the window 92

The determiner 300 can be configured to select a plurality of cleanup methods described later in accordance with the degree of dirt on the window 92. Specifically, the determiner 300 can be configured to use, as a dirt indicator for indicating the degree of dirt on the window 92, any one of the following first to third dirt indicators D1 to D3:

The first dirt indicator D1 represents the absolute difference between the clutter peak level H1 and a value of the intensity threshold It1 for the at least one pixel in the view region 80.

The second dirt indicator D2 represents the number of pixels in the view region 80, which corresponds to the area of dirt on the window 92.

The third dirt indicator D3 represents the sum of the absolute differences, each of which is between the clutter peak level H1 for the corresponding one of the pixels in the view region and the value of the intensity threshold It1.

The larger each of the first to third dirt indicators D1, D2, and D3, the larger the degree of dirt on the window 92.

That is, the determiner 300 can be configured to calculate any one of the first to third dirt indicators D1, D2, and D3, and send the calculated one of the first to third dirt indicators D1, D2, and D3 to the cleanup unit 400.

The cleanup unit 400 can be configured to select one of the plurality of cleanup methods, whose dirt removal abilities are different from one another, in accordance with the degree of dirt on the window 92 specified by one of the first to third dirt indicators D1, D2, and D3 sent to the cleanup unit 400, For example, the degree of dirt on the window 92 is previously divided into, for example, first to third dirt levels, and the cleanup unit 400 can be configured to select, as the plurality of cleanup methods, one of the following first to third cleanup methods E1 to E3 in accordance with one of the first to third dirt indicators D1, D2, and D3 sent to the cleanup unit 400.

The first cleanup method E1 is to clean up the window 92 using at least one of the first and second washers 410 and 420 that uses a jet of only air.

The second cleanup method E2 is to clean up the window 92 using at least one of the first and second washers 410 and 420 that uses both a jet of air and a jet of water.

The third cleanup method E3 is to clean up the window 92 using at least one of the first and second washers 410 and 420 and the wiper unit.

The first, second, and third cleanup methods E1, E2, and E3 have respective first, second, and third different dirt removal abilities that are arranged in an ascending order from the lowest dirt removal ability to the highest dirt removal ability. This enables the first cleanup method E1 to be employed if the degree of dirt on the window 92 is the first dirt level, the second cleanup method E2 to be employed if the degree of dirt on the window 92 is the second dirt level, and the third cleanup method E3 to be employed if the degree of dirt on the window 92 is the third dirt level.

The operation in step S400 can be eliminated.

In response to determination that there is dirt on the window 92, the determiner 300 can be preferably configured to send information indicative of dirt on the window 92 to one or more occupants in the vehicle in which the distance measuring apparatus 20 is installed. For example, the determiner 300 can be configured to instruct the information unit 510, which includes a display unit or a speaker, to visibly and/or audibly output the information indicative of dirt on the window 92 to one or more occupants in the vehicle.

Preferably, the information indicative of dirt on the window 92 to be outputted to one or more occupants in the vehicle can include an area on the outer surface of the window 92 where dirt is located.

The calculator 200 can be configured not to output data indicative of the distance of the outside object OBJ through the area on the outer surface of the window 92, and to output data indicative of the distance of the outside object OBJ through the remaining area of the outer surface of the window 92; dirt is not included in the remaining area of the outer surface of the window 92.

Let us assume that the determiner 300 uses one of the dirt determination condition II and the dirt determination condition N.

In this assumption, the determiner 300 can be configured to instruct the informing unit 510 to send information indicative of dirt on the window 92 to one or more occupants in the vehicle without instructing the cleanup unit 400 to perform the dirt removal task if (i) The number of selected pixels in the view region 80 is greater than or equal to a predetermined first number threshold; the clutter peak level H1 at the previously specified value Tc of the TOF Tf for each of the selected pixels in the view region 80 is larger than or equal to a value of the intensity threshold It1

(ii) The number of selected pixels in the view region 80 is larger than or equal to a predetermined second number threshold that is larger than the first number threshold Otherwise, the determiner 300 can be configured to instruct the cleanup unit 400 to perform the dirt removal task if (i) The number of selected pixels in the view region 80 is greater than or equal to the predetermined first number threshold (ii) The number of selected pixels in the view region 80 is smaller than the predetermined second number threshold This configuration enables determination of whether it is difficult for the cleanup unit 400 to remove the dirt on the window 92.

In response to determination that no dirt is adhered to the window 92, the determiner 300 can be configured to calculate one or more new values of the threshold setting parameter in accordance with the clutter peak level H1, and store the calculated one or more new values of the threshold setting parameter in the storage 310 to accordingly update previously stored one or more values of the threshold setting parameter to the new one or more values thereof.

In this modification, the determiner 300 can be configured to instruct the cleanup unit 400 to (i) perform the dirt removal task, (ii) measure the clutter peak level H1 after the dirt removal task, (iii) calculate one or more new values of the threshold setting parameter in accordance with the clutter peak level H1, and (iv) store the calculated one or more new values of the threshold setting parameter in the storage 310 to accordingly update previously stored one or more values of the threshold setting parameter to the new one or more values thereof. For example, the determiner 400 can be configured to perform a calculation method of calculating one or more new values of the threshold setting parameter in accordance with the clutter peak level H1 and the initial clutter peak level H0. Using the calculation method enables determination of whether there is dirt on the window 92 in view of age deterioration of the light emitter 40 and/or distortion of the window 92, making it possible to prevent missing of dirt on the window 92.

If the vehicle, which has traveled normally, is stopped without determination that there is dirt on the window 92, the determiner 300 can be configured to calculate one or more new values of the threshold setting parameter in accordance with the clutter peak level H1 which is measured during the normal traveling of the vehicle, and store the calculated one or more new values of the threshold setting parameter in the storage 310 to accordingly update previously stored one or more values of the threshold setting parameter to the new one or more values thereof. This enables determination of whether there is dirt on the window 92 in view of age deterioration of the light emitter 40 and/or distortion of the window 92, making it possible to prevent missing of dirt on the window 92.

As described above, the distance measuring apparatus 20 of the exemplary embodiment is configured to determine that there is dirt on the window 92 in response to determination that the dirt determination condition previously determined based on the received light intensity H1 at the specified value Tc of the TOF Tf is satisfied. This configuration therefore enables determination of whether there is dirt on the window 92 in accordance with received light-intensity levels of incoming light to the distance measuring apparatus 20.

The determination processor 100 and methods performed by the determination processor described in the present disclosure can be implemented by a dedicated computer including a memory and a processor programmed to perform one or more functions embodied by one or more computer programs.

The determination processor 100 and methods performed by the determination processor described in the present disclosure can also be implemented by a dedicated computer including a processor comprised of one or more dedicated hardware logic circuits.

The determination processor 100 and methods performed by the determination processor described in the present disclosure can further be implemented by at least one dedicated computer comprised of a memory, a processor programmed to perform one or more functions embodied by one or more computer programs, and one or more hardware logic circuits.

The one or more computer programs can be stored in a non-transitory storage medium as instructions to be carried out by a computer.

The present disclosure is not limited to the exemplary embodiment described herein, but can be implemented by various modifications. The specific features described in the present disclosure can be freely combined to each other unless the combined features have a contradiction therebetween.

What is claimed is:

1. A distance measuring apparatus comprising:
   a light emitter configured to emit light pulses to a view region that is comprised of a plurality of pixels;
   a receiver configured to receive light echoes, each of the light echoes being based on reflection of a corresponding one of the emitted light pulses from a target object, the light echoes respectively having values of time of flight between the light emitter and the receiver;
   a calculator configured to:
      calculate, in accordance with the light echoes, a histogram representing an intensity level of each of the light echoes for a corresponding one of the values of the time of flight, the histogram having a predetermined baseline intensity level; and
      calculate, in accordance with the values of the time of flight, a distance of the target object from the distance measuring apparatus;
   a case that houses at least the light emitter and the receiver, the case having a window through which the light pulses and light echoes pass;
   wherein values of a threshold setting parameter in the view region are previously determined for the respective pixels of the view region,
   the distance measuring apparatus further comprising:
   a determiner configured to:
      add the value of the threshold setting parameter for each of the pixels of the view region to the baseline intensity level to thereby calculate a value of an intensity threshold for a corresponding one of the pixels of the view region;
      determine whether dirt is adhered to the window in accordance with a predetermined dirt determination condition; and
      determine that the dirt is adhered to the window in response to determination that the predetermined dirt determination condition is satisfied,
   the predetermined dirt determination condition including a first condition that a specified light intensity level at a specified value of the time of flight for at least one pixel of the view region in the histogram is larger than or equal to at least one value of the intensity threshold calculated for the at least one pixel of the view region,
   the specified value of the time of flight corresponding to a length of a light path defined from the light emitter to the window.

2. The distance measuring apparatus according to claim 1, wherein:
   the predetermined dirt determination condition includes:
      a second condition that there is a group of selected pixels in the view region for which a number of pixels is greater than or equal to a predetermined number threshold, and the specified light intensity level at the specified value of the time of flight for each of the selected pixels of the group in the histogram is larger than or equal to a corresponding one of the values of the intensity threshold; and
      a third condition that the number of pixels is greater than or equal to the predetermined number threshold and the selected pixels are successively adjacent to each other to constitute a pixel assembly, the specified light intensity level at the specified value of the time of flight for each of the selected pixels of the view region in the histogram being larger than or equal to a corresponding one of the values of the intensity threshold.

3. The distance measuring apparatus according to claim 1, wherein:
   the receiver is comprised of a plurality of distance-measurement pixels for distance measurement, and a plurality of dirt-detection pixels for dirt detection.

4. The distance measuring apparatus according to claim 1, wherein:
   a light intensity assembly representing a distribution of light intensity levels in the view region is defined as a light intensity frame; and
   the determiner is configured to determine whether dirt is adhered to the window based on:
      the specified light intensity level for each of successive L light intensity frames, L being an integer greater than or equal to 2; and
      the at least one value of the intensity threshold calculated for the at least one pixel of the view region for each of the successive L frames.

5. The distance measuring apparatus according to claim 4, wherein:
   the determiner is configured to determine that the dirt is adhered to the window in response to determination that the dirt determination condition is satisfied for each of the successive L light intensity frames.

6. The distance measuring apparatus according to claim 4, wherein:
   L is an integer greater than or equal to 3;
   M is an integer greater than or equal to 2; and
   the determiner is configured to determine that the dirt is adhered to the window in response to determination that the dirt determination condition is satisfied for each of the M light intensity frames included in the successive L light intensity frames.

7. The distance measuring apparatus according to claim 4, wherein:
   the determiner is configured to determine whether dirt is adhered to the window based on at least one of:
      a total of the specified light intensity levels for the respective successive L light intensity frames and a total of plural values of the intensity threshold calculated for the respective successive L light intensity frames; and
      an average of the specified light intensity levels for the respective successive L light intensity frames and an average of the plural values of the intensity threshold calculated for the respective successive L light intensity frames.

8. The distance measuring apparatus according to claim 1, further comprising:
   a cleanup unit configured to perform, in response to determination that the dirt is adhered to the window, a dirt removal task of removing the dirt on the window.

9. The distance measuring apparatus according to claim 8, wherein:

the cleanup unit is configured to:

select one of a plurality of predetermined cleanup methods in accordance with a location of the dirt adhered to the window; and perform the selected one of the plurality of predetermined cleanup methods.

10. The distance measuring apparatus according to claim 9, wherein:

the cleanup unit comprises at least first and second washers configured to clean up first and second areas of the window, the first and second areas of the window being located to be different from each other; and the determiner is configured to select, in accordance with the location of the dirt adhered to the window, one of the first and second washers, and instruct the selected one of the first and second washers to clean up a corresponding one of the first and second areas.

11. The distance measuring apparatus according to claim 8, wherein:

the cleanup unit is configured to:

select a plurality of predetermined cleanup methods in accordance with a degree of the dirt adhered to the window, the plurality of cleanup methods respectively having dirt removal abilities that are different from one another; and perform a selected one of the plurality of predetermined cleanup methods.

12. The distance measuring apparatus according to claim 11, wherein:

the determiner is configured to:

calculate, as a dirt indicator indicative of the degree of the dirt adhered to the window, one of:

a first dirt indicator indicative of an absolute difference between the specified light intensity level and a selected value of the intensity threshold for a selected pixel in the view region;

a second dirt indicator indicative of a group of selected pixels in the view region, the selected pixels corresponding to an area of the window in which the dirt is located; and a third dirt indicator indicative of a total of absolute differences, each of the absolute differences being defined between the specified light intensity level of a corresponding one of the selected pixels and the selected value of the intensity threshold for a corresponding one of the selected pixels; and send the selected one of the first dirt indicator, the second dirt indicator, and the third dirt indicator to the cleanup unit.

13. The distance measuring apparatus according to claim 2, further comprising:

a cleanup unit configured to perform, in response to determination that the dirt is adhered to the window, a dirt removal task of removing the dirt on the window, wherein:

the determiner is configured to:

determine, in response to a determination that there is a group of selected pixels in the view region for which a number of pixels is greater than or equal to a first number threshold that is the predetermined number threshold, and whether the number of pixels is greater than or equal to a second number threshold that is larger than the first number threshold;

send information indicative of the dirt adhered to the window to a user without instructing the cleanup unit to perform the dirt removal task in response to determination that the number of pixels is greater than or equal to the second number threshold that is larger than the first number threshold; and instruct the cleanup unit to perform the dirt removal task in response to determination that the number of pixels is smaller than the second number threshold.

14. The distance measuring apparatus according to claim 8, wherein:

the determiner is configured to:

calculate, based on the specified light intensity level, new values of the threshold setting parameter while it is determined that no dirt is adhered to the window; and store the new values of the threshold setting parameter in a storage to accordingly update the values of the threshold setting parameter previously stored in the storage to the respective new values of the threshold setting parameter.

15. The distance measuring apparatus according to claim 1, wherein:

the determiner is configured to externally output information indicative of a location of the dirt adhered to the window.

16. The distance measuring apparatus according to claim 1, wherein:

the calculator is configured not to externally output the distance of the target object through an area of the window where the dirt lies, and configured to externally output the distance of the target object through a remaining area of the window where no dirt lies.

17. A distance measuring apparatus comprising:

a light emitter configured to emit light pulses to a view region that is comprised of a plurality of pixels;

a receiver configured to receive light echoes, each of the light echoes being based on reflection of a corresponding one of the emitted light pulses from a target object, the light echoes respectively having values of time of flight between the light emitter and the receiver;

a calculator configured to:

calculate, in accordance with the light echoes, a histogram representing an intensity level of each of the light echoes for a corresponding one of the values of the time of flight, the histogram having a predetermined baseline intensity level, a predetermined maximum level at which a light intensity level at each of the values of the time of flight is able to arrive, and an effective intensity-level width defined by subtracting the baseline intensity level from the maximum level; and calculate, in accordance with the values of the time of flight, a distance of the target object from the distance measuring apparatus; and a case that houses at least the light emitter and the receiver, the case having a window through which the light pulses and light echoes pass, wherein values of a threshold setting parameter in the view region are previously determined for the respective pixels of the view region, each value of the threshold setting parameter being individually set to be smaller than 1, the distance measuring apparatus further comprising:

a determiner configured to:

calculate a product of the value of the threshold setting parameter for each of the pixels of the view region and the effective intensity-level width;

add the product for each of the pixels of the view region to the baseline intensity level to thereby calculate a value of an intensity threshold for a corresponding one of the pixels of the view region;

determine whether dirt is adhered to the window in accordance with a predetermined dirt determination condition; and determine that the dirt is adhered to the window in response to determination that the predetermined dirt determination condition is satisfied, the predetermined dirt determination condition including a first condition that a specified light intensity level at a specified value of the time of flight for at least one pixel of the view region in the histogram is larger than or equal to at least one value of the intensity threshold calculated for the at least one pixel of the view region, the specified value of the time of flight corresponding to a length of a light path defined from the light emitter to the window.

18. The distance measuring apparatus according to claim 17, wherein:

the predetermined dirt determination condition includes:

a second condition that there is a group of selected pixels in the view region for which a number of pixels is greater than or equal to a predetermined number threshold, and the specified light intensity level at the specified value of the time of flight for each of the selected pixels of the group in the histogram is larger than or equal to a corresponding one of the values of the intensity threshold; and a third condition that the number of pixels is greater than or equal to the predetermined number threshold and the selected pixels are successively adjacent to each other to constitute a pixel assembly, the specified light intensity level at the specified value of the time of flight for each of the selected pixels of the view region in the histogram being larger than or equal to a corresponding one of the values of the intensity threshold.

19. The distance measuring apparatus according to claim 17, wherein:

the receiver is comprised of a plurality of distance-measurement pixels for distance measurement, and a plurality of dirt-detection pixels for dirt detection.

20. The distance measuring apparatus according to claim 17, wherein:

a light intensity assembly representing a distribution of light intensity levels in the view region is defined as a light intensity frame; and the determiner is configured to determine whether dirt is adhered to the window based on:

the specified light intensity level for each of successive L light intensity frames, L being an integer greater than or equal to 2; and the at least one value of the intensity threshold calculated for the at least one pixel of the view region for each of the successive L frames.

21. The distance measuring apparatus according to claim 20, wherein:

the determiner is configured to determine that the dirt is adhered to the window in response to determination that the dirt determination condition is satisfied for each of the successive L light intensity frames.

22. The distance measuring apparatus according to claim 20, wherein:

L is an integer greater than or equal to 3;

M is an integer greater than or equal to 2; and the determiner is configured to determine that the dirt is adhered to the window in response to determination that the dirt determination condition is satisfied for each of the M light intensity frames included in the successive L light intensity frames.

23. The distance measuring apparatus according to claim 20, wherein:

the determiner is configured to determine whether dirt is adhered to the window based on at least one of:

a total of the specified light intensity levels for the respective successive L light intensity frames and a total of plural values of the intensity threshold calculated for the respective successive L light intensity frames; and an average of the specified light intensity levels for the respective successive L light intensity frames and an average of the plural values of the intensity threshold calculated for the respective successive L light intensity frames.

24. The distance measuring apparatus according to claim 17, further comprising:

a cleanup unit configured to perform, in response to determination that the dirt is adhered to the window, a dirt removal task of removing the dirt on the window.

25. The distance measuring apparatus according to claim 24, wherein:

the cleanup unit is configured to:

select one of a plurality of predetermined cleanup methods in accordance with a location of the dirt adhered to the window; and perform the selected one of the plurality of predetermined cleanup methods.

26. The distance measuring apparatus according to claim 25, wherein:

the cleanup unit comprises at least first and second washers configured to cleaning up first and second areas of the window, the first and second areas of the window being located to be different from each other; and the determiner is configured to select, in accordance with the location of the dirt adhered to the window, one of the first and second washers, and instruct the selected one of the first and second washers to clean up a corresponding one of the first and second areas.

27. The distance measuring apparatus according to claim 24, wherein:

the cleanup unit is configured to:

select a plurality of predetermined cleanup methods in accordance with a degree of the dirt adhered to the window, the plurality of cleanup methods respectively having dirt removal abilities that are different from one another; and perform a selected one of the plurality of predetermined cleanup methods.

28. The distance measuring apparatus according to claim 27, wherein:

the determiner is configured to:

calculate, as a dirt indicator indicative of the degree of the dirt adhered to the window, one of:

a first dirt indicator indicative of an absolute difference between the specified light intensity level and a selected value of the intensity threshold for a selected pixel in the view region;

a second dirt indicator indicative of a group of selected pixels in the view region, the selected pixels corresponding to an area of the window in which the dirt is located; and a third dirt indicator indicative of a total of absolute differences, each of the absolute differences being defined between the specified light intensity level of a corresponding one of the selected pixels and the selected value of the intensity threshold for a corresponding one of the selected pixels; and send the selected one of the first dirt indicator, the second dirt indicator, and the third dirt indicator to the cleanup unit.

29. The distance measuring apparatus according to claim 18, further comprising:

a cleanup unit configured to perform, in response to determination that the dirt is adhered to the window, a dirt removal task of removing the dirt on the window, wherein:

the determiner is configured to:

determine, in response to a determination that there is a group of selected pixels in the view region for which a number of pixels is greater than or equal to a first number threshold that is the predetermined number threshold, whether the number of pixels is greater than or equal to a second number threshold that is larger than the first number threshold;

send information indicative of the dirt adhered to the window to a user without instructing the cleanup unit to perform the dirt removal task in response to determination that the number of pixels is greater than or equal to the second number threshold that is larger than the first number threshold; and instruct the cleanup unit to perform the dirt removal task in response to determination that the number of pixels is smaller than the second number threshold.

30. The distance measuring apparatus according to claim 24, wherein:

the determiner is configured to:

calculate, based on the specified light intensity level, new values of the threshold setting parameter while it is determined that no dirt is adhered to the window; and store the new values of the threshold setting parameter in a storage to accordingly update the values of the threshold setting parameter previously stored in the storage to the respective new values of the threshold setting parameter.

31. The distance measuring apparatus according to claim 17, wherein:

the determiner is configured to externally output information indicative of a location of the dirt adhered to the window.

32. The distance measuring apparatus according to claim 17, wherein:

the calculator is configured not to externally output the distance of the target object through an area of the window where the dirt lies, and configured to externally output the distance of the target object through a remaining area of the window where no dirt lies.

33. A method of determining dirt on a window of a distance measuring apparatus, the distance measuring apparatus comprising:

a light emitter configured to emit light pulses to a view region that is comprised of a plurality of pixels; and a receiver configured to receive light echoes, each of the light echoes being based on reflection of a corresponding one of the emitted light pulses from a target object, the light echoes respectively having values of time of flight between the light emitter and the receiver;

a calculator configured to:

calculate, in accordance with the light echoes, a histogram representing an intensity level of each of the light echoes for a corresponding one of the values of the time of flight, the histogram having a predetermined baseline intensity level; and calculate, in accordance with the values of the time of flight, a distance of the target object from the distance measuring apparatus; and a case that houses at least the light emitter and the receiver, the case having a window through which the light pulses and light echoes pass, wherein values of a threshold setting parameter in the view region are previously determined for the respective pixels of the view region, the method further comprising:

obtaining a specified light intensity level at a specified value of the time of flight for at least one pixel of the view region in the histogram, the specified value of the time of flight corresponding to a length of a light path defined from the light emitter to the window;

adding the value of the threshold setting parameter for each of the pixels of the view region to the baseline intensity level to thereby calculate a value of an intensity threshold for a corresponding one of the pixels of the view region;

determining whether dirt is adhered to the window in accordance with a predetermined dirt determination condition; and determining that the dirt is adhered to the window in response to determination that the predetermined dirt determination condition is satisfied, the predetermined dirt determination condition including a first condition that the specified light intensity level at the specified value of the time of flight for at least one pixel of the view region in the histogram is larger than or equal to at least one value of the intensity threshold calculated for the at least one pixel of the view region.

34. A method of determining dirt on a window of a distance measuring apparatus, the distance measuring apparatus comprising:

a light emitter configured to emit light pulses to a view region that is comprised of a plurality of pixels;

a receiver configured to receive light echoes, each of the light echoes being based on reflection of a corresponding one of the emitted light pulses from a target object, the light echoes respectively having values of time of flight between the light emitter and the receiver;

a calculator configured to:

calculate, in accordance with the light echoes, a histogram representing an intensity level of each of the light echoes for a corresponding one of the values of the time of flight, the histogram having a predetermined baseline intensity level, a predetermined maximum level at which a light intensity level at each of the values of the time of flight is able to arrive, and an effective intensity-level width defined by subtracting the baseline intensity level from the maximum level; and calculate, in accordance with the values of the time of flight, a distance of the target object from the distance measuring apparatus; and a case that houses at least the light emitter and the receiver, the case having a window through which the light pulses and light echoes pass, wherein values of a threshold setting parameter in the view region are previously determined for the respective pixels of the view region, each value of the threshold setting parameter being individually set to be smaller than 1, the method further comprising:

obtaining a specified light intensity level at a specified value of the time of flight for at least one pixel of the view region in the histogram, the specified value of the time of flight corresponding to a length of a light path defined from the light emitter to the window;

calculating a product of the value of the threshold setting parameter for each of the pixels of the view region and the effective intensity-level width;

adding the product for each of the pixels of the view region to the baseline intensity level to thereby calculate a value of an intensity threshold for a corresponding one of the pixels of the view region;

determining whether dirt is adhered to the window in accordance with a predetermined dirt determination condition; and determining that the dirt is adhered to the window in response to determination that the predetermined dirt determination condition is satisfied, the predetermined dirt determination condition including a first condition that a specified light intensity level at a specified value of the time of flight for at least one pixel of the view region in the histogram is larger than or equal to at least one value of the intensity threshold calculated for the at least one pixel of the view region.

\* \* \* \* \*